United States Patent
Covington (10) Patent No.: US 9,058,053 B2
(45) Date of Patent: Jun. 16, 2015

(54) VIRTUAL REALITY DISPLAY SYSTEM

(71) Applicant: The Boeing Company, Chicago, IL (US)

(72) Inventor: Christopher Leonard Covington, Rockville, MD (US)

(73) Assignee: THE BOEING COMPANY, Chicago, IL (US)

( * ) Notice: Subject to any disclaimer, the term of this patent is extended or adjusted under 35 U.S.C. 154(b) by 218 days.

(21) Appl. No.: 13/661,971

(22) Filed: Oct. 26, 2012

(65) Prior Publication Data

US 2014/0118357 A1    May 1, 2014

(51) Int. Cl.
*G06T 15/00* (2011.01)
*G06F 3/01* (2006.01)

(52) U.S. Cl.
CPC ............... *G06F 3/011* (2013.01); *G06F 3/013* (2013.01)

(58) Field of Classification Search
None
See application file for complete search history.

(56) References Cited

U.S. PATENT DOCUMENTS

| | | | |
|---|---|---|---|
| 6,529,331 B2 * | 3/2003 | Massof et al. | 359/630 |
| 7,091,929 B2 | 8/2006 | Bronson | |
| 8,130,260 B2 * | 3/2012 | Krill et al. | 348/53 |
| 2012/0036433 A1 | 2/2012 | Zimmer et al. | |

* cited by examiner

*Primary Examiner* — Said Broome
(74) *Attorney, Agent, or Firm* — Yee & Associates, P.C.

(57) ABSTRACT

A method and apparatus for displaying a virtual environment. First eye position information for a first eye in a head of a person and second eye position information for a second eye in the head of the person is received. A first image of the virtual environment for the first eye is generated based on the first eye position information. A second image of the virtual environment for the second eye is generated based on the second eye position information for the second eye. The first image and the second image for display are sent to the person.

14 Claims, 8 Drawing Sheets

VIRTUAL REALITY DISPLAY SYSTEM

BACKGROUND INFORMATION

1. Field

The present disclosure relates generally to displayed information and, in particular, to displayed information on a display device. Still more particularly, the present disclosure relates to a method and apparatus for displaying information from a virtual environment.

2. Background

A virtual environment is a computer-simulated environment. In particular, a virtual environment provides a virtual reality for a person. In other words, in a virtual environment, a simulation of a physical presence of places in the real world as well as imaginary worlds may be made. A virtual environment may be displayed using a display device such as a display screen or a head-mounted display. With a display screen, the virtual environment may be displayed in three dimensions using three-dimensional glasses. With head-mounted displays, the virtual environment may be displayed in three dimensions using stereoscopic displays. Additionally, other sensory information such as sound and tactile feedback also may be generated for the virtual environment.

The generation of images for the virtual environment represents the environment in a manner that is unnatural and disorienting to the person viewing the virtual environment. In particular, the images are two-dimensional images generated using a single viewpoint to render and display images to a person. For example, many currently used virtual environment systems employ a single viewpoint for a camera generating images.

Currently, head tracking may be used to reduce the perception that a two-dimensional image is being displayed to the operator. The use of head tracking may more accurately represent the view of the person within the virtual environment. Some virtual environment systems may provide stereographic images in an attempt to provide a three-dimensional view of the virtual environment.

Even with head tracking and stereographic images, the display devices used in currently available virtual environment systems may still have undesired effects. These undesired effects may include at least one of disorientation, blurriness, fatigue, eye strain, headaches, or other undesired effects. Further, with longer periods of viewing the virtual environment, these undesired effects may increase.

For example, many virtual environment systems generate two-dimensional images from a three-dimensional environment in a manner that may cause eye fatigue. The current systems may force the eyes to focus in an unnatural manner such as in a cross-eyed manner.

Different types of mechanisms have been used in an attempt to reduce undesired effects. For example, some three-dimensional display systems use polarizing lenses. Other systems may use shutter glasses that block one eye as one image is displayed to the other eye.

These types of systems still may result in undesired effects. Therefore, it would be desirable to have a method and apparatus that takes into account at least some of the issues discussed above, as well as other possible issues.

SUMMARY

In one illustrative embodiment, an apparatus comprises an image processor. The image processor is configured to receive first eye position information for a first eye in a head of a person and second eye position information for a second eye in the head of the person. The image processor is further configured to generate a first image of a virtual environment for the first eye based on the first eye position information for the first eye. The image processor is further configured to generate a second image of the virtual environment for the second eye based on the second eye position information for the second eye. The image processor is further configured to send the first image and the second image for display to the person.

In another illustrative embodiment, a method for displaying a virtual environment is present. First eye position information for a first eye in a head of a person and second eye position information for a second eye in the head of the person is received. A first image of the virtual environment for the first eye is generated based on the first eye position information for the first eye. A second image of the virtual environment for the second eye is generated based on the second eye position information for the second eye. The first image and the second image for display are sent to the person.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that having two viewpoints for generating images may provide a more natural viewing experience for a person. The illustrative embodiments recognize and take into account that currently available virtual environment systems do not take into account individual differences between different persons who may view the virtual environment. Instead, these systems use preselected metrics or values to generate the viewpoints.

The illustrative embodiments recognize and take into account, however, that the viewpoints used by currently available virtual environment systems may not reduce undesired effects as much as desired without taking into account differences in the eyes of different persons. For example, different people may have different distances between the eyes and the eyes may have different heights. As a result, the viewpoints for the eyes from one person to another person may be very different.

The illustrative embodiments recognize and take into account that without the correct viewpoints, the resulting images viewed by the eyes do not appear natural to the person processing the images. As a result, a person focusing on different portions of the images generated for the virtual environment may also notice discrepancies in the virtual environment such as how the virtual environment should look and how the virtual environment is actually represented if the viewpoints of the person are different from those used to generate the images. The viewpoint of a person may be identified based on the orientation of both eyes of the person. A ray may be extended from each eye based on the orientation. The intersection of these rays may be used as the viewpoint.

In essence, the person processes the images expecting that two slightly dissimilar views are captured by each of the eyes. By presenting an image from a viewpoint of each eye, the person may be able to reconstruct the virtual environment through normal processing.

Virtual environments may be used for a number of different purposes. For example, a virtual environment is most often used in gaming. Virtual environments, however, have many other uses. For example, virtual environments may be used to perform engineering tasks, maintenance tasks, simulations, analysis, and other suitable tasks.

Thus, the illustrative embodiments provide a method and apparatus for displaying a virtual environment to a person. In one illustrative embodiment, an image processor is configured to receive first eye position information for a first eye in the head of the person and second eye position information for a second eye in the head of the person. A first image of a virtual environment is generated for the first eye based on the first eye position information. A second image of a virtual environment is generated for the second eye based on the second eye position information. The first image and the second image are then sent for display to the person.

Figure 1:
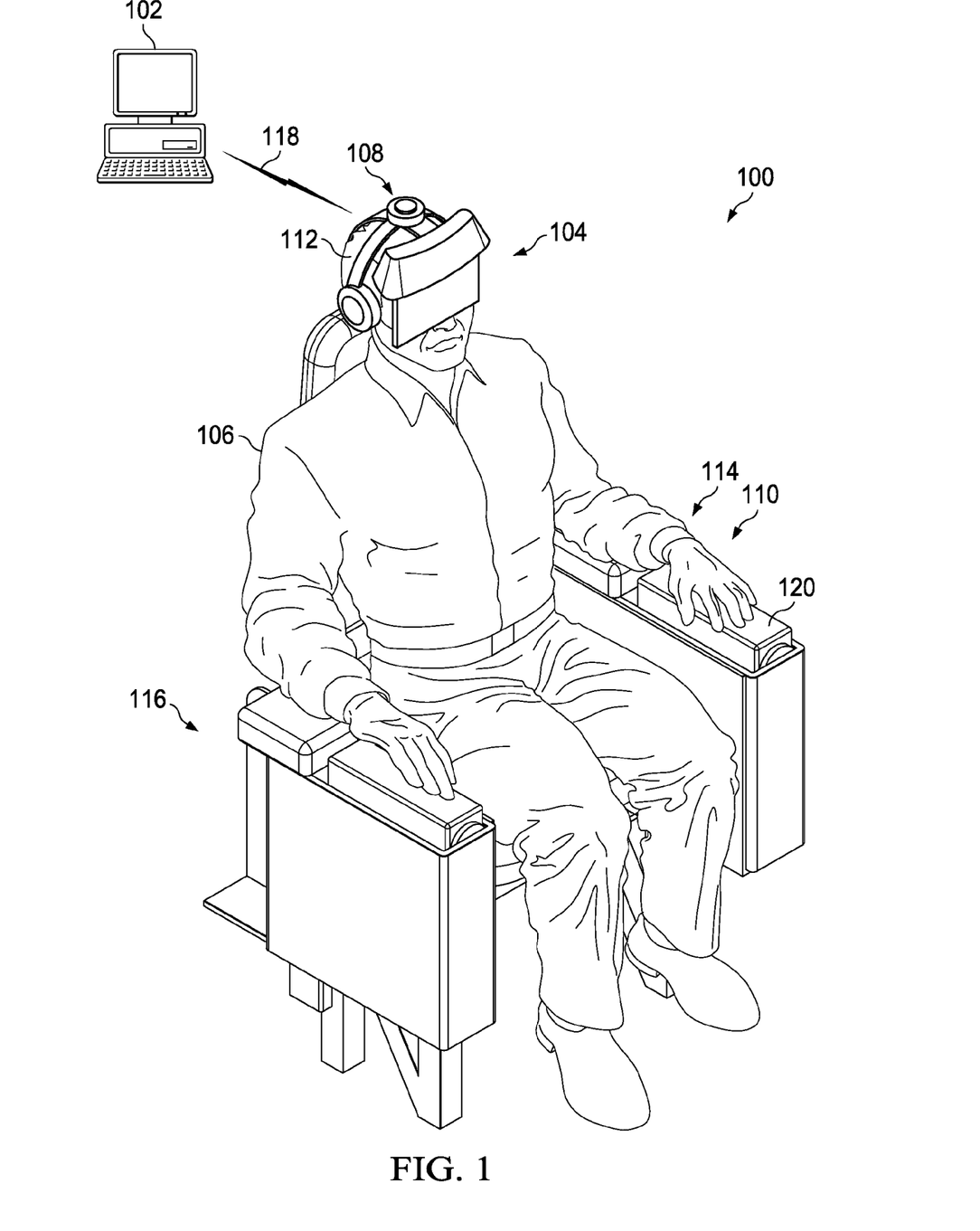
FIG. 1 is an illustration of a virtual environment system in accordance with an illustrative embodiment.

With reference now to the figures and, in particular, with reference to FIG. 1, an illustration of a virtual environment system is depicted in accordance with an illustrative embodiment. In this illustrative example, virtual environment system 100 includes computer 102 and interface system 104. As depicted, interface system 104 includes person 106, head-mounted display device 108 and data gloves 110. Head-mounted display device 108 is located on head 112 of person 106. Data gloves 110 are located on hands 114 of person 106.

Virtual environment system 100 and person 106 are located in physical environment 116. Virtual environment system 100 allows person 106 in physical environment 116 to interact with a virtual environment generated by virtual environment system 100.

In these illustrative examples, head-mounted display device 108 and data gloves 110 provide person 106 with an ability to interact with a virtual environment generated by computer 102. The information exchanged during the interaction of person 106 with the virtual environment generated by computer 102 in virtual environment system 100 occurs over wireless communications link 118.

As depicted, data gloves 110 are input devices for person 106. In particular, data gloves 110 may be able to identify a position of data gloves 110 worn on hands 114 of person 106. Additionally, data gloves 110 also may provide haptic feedback that simulates a sense of touch. Haptic feedback may provide a sense of touch by applying forces, vibrations, motions or some combination thereof to hands 114 of person 106.

In these illustrative examples, head-mounted display device 108 is configured to display the virtual environment generated by computer 102 to person 106. The images are generated as part of the interaction of person 106 with the virtual environment generated by computer 102.

Head-mounted display device 108 is also configured to provide a display of the virtual environment in a manner that results in less undesired effects by person 106 using head-mounted display device 108 over time. In particular, person 106 may use head-mounted display device 108 for longer periods of time than currently available display devices in a manner that reduces undesired effects such as disorientation, blurriness, and fatigue.

In these illustrative examples, head-mounted display device 108 is configured to identify a position of head 112 as well as eyes (not shown) in head 112 of person 106. With position information for both head 112 and the eyes of person 106, computer 102 generates images tailored to the viewpoint of each eye of person 106.

In particular, computer 102 identifies a position of head 112 of person 106 in the virtual environment. Additionally, head-mounted display device 108 also generates information about the position of the eyes in head 112 of person 106. Head-mounted display device 108 sends the information to computer 102 over wireless communications link 118.

With position information for head 112 and the eyes of person 106 in head 112, computer 102 generates images from the perspective of each eye in the virtual environment. These images are sent to head-mounted display device 108 over wireless communications link 118. In other words, each eye in head 112 of person 106 may have a slightly different perspective since they are spaced apart from each other.

In this illustrative example, the position of each eye is tracked independently of person 106. In this manner, an exact focal point of person 106 in physical environment 116 may be identified. The position information for head 112 and the eyes of person 106 is used by computer 102. This information is translated by computer 102 into a corresponding position of person 106 in the virtual environment.

The position of head 112 of person 106 may change depending on whether person 106 is standing, sitting, crouching, laying down, or in some other position. In this example, person 106 is sitting in chair 120 while interacting with the virtual environment.

In this manner, computer 102 positions virtual cameras in the virtual environment in the same manner as the eyes of person 106 in the virtual environment are used to generate different views of the virtual environment. In other words, the positions of the virtual cameras correspond to the positions of the eyes of person 106. The positions of the virtual cameras corresponding to the positions of the eyes of person 106 may change as the position of person 106 changes.

One view is generated for each eye of person 106. An image of each view is generated and sent back to head-mounted display device 108 for display to person 106. In this manner, independent two-dimensional images may be displayed to person 106 on head-mounted display device 108.

In these illustrative examples, the eyes of person 106 reconstruct a perceived three-dimensional image of the virtual environment from the two two-dimensional images displayed on head-mounted display device 108. In this manner, natural human binocular vision processing occurs in person 106 to generate the three-dimensional image for the virtual environment using the two two-dimensional images generated by computer 102.

In these illustrative examples, natural human binocular vision involves using two eyes. With natural human binocular vision processing, images viewed by both eyes may be used to generate a three-dimensional view. In other words, person 106 may be able to perceive depth.

As the eyes of person 106, head 112 of person 106, or both move, the focal point of person 106 may change. The information generated by head-mounted display device 108 is sent to computer 102 over wireless communications link 118. Computer 102 uses this information to recalculate the focal point of person 106 in a corresponding position for the virtual cameras in the virtual environment. Updated two-dimensional images are generated from the different virtual cameras representing the eyes of person 106 in the virtual environment.

As a result, a more accurate representation of a virtual environment is generated for display on head-mounted display device 108 to person 106. With this type of display, a closer match to the natural vision of person 106 occurs. In this manner, undesired effects of viewing a virtual environment using two-dimensional images by person 106 may be reduced. A decrease in undesired effects also occurs in addition to a more realistic view of the virtual environment to person 106 using head-mounted display device 108.

Figure 2:
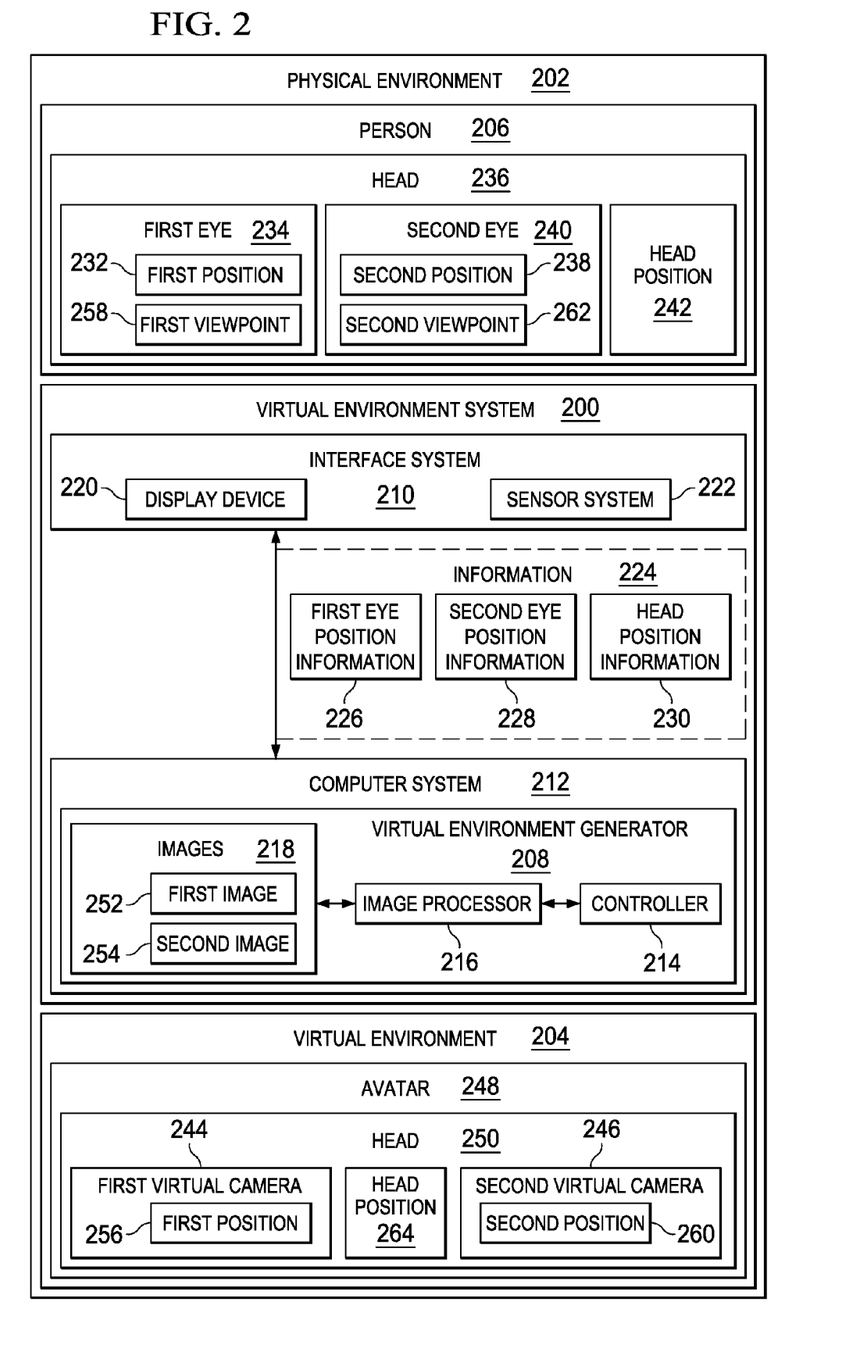
FIG. 2 is an illustration of a block diagram of a virtual environment system in accordance with an illustrative embodiment.

Turning now to FIG. 2, an illustration of a block diagram of a virtual environment system is depicted in accordance with an illustrative embodiment. Virtual environment system 100 in FIG. 1 is an example of one implementation for virtual environment system 200 shown in block form in this figure.

As depicted, virtual environment system 200 is located in physical environment 202. Virtual environment system 200 is configured to generate virtual environment 204 for person 206. Person 206 may interact with virtual environment 204 through virtual environment system 200.

In these illustrative examples, virtual environment system 200 includes a number of different components. As depicted, virtual environment system 200 includes virtual environment generator 208 and interface system 210. These components operate to generate virtual environment 204 and to provide person 206 with an ability to interact with virtual environment 204.

In these illustrative examples, virtual environment generator 208 may be implemented in hardware, software, or a combination of the two. In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In these illustrative examples, virtual environment generator 208 may be implemented in computer system 212. Computer system 212 may be one or more computers. When more than one computer is present in computer system 212, those computers may be in communication with each other over a communications medium such as a network.

In this illustrative example, virtual environment generator 208 includes controller 214 and image processor 216. Controller 214 is configured to generate virtual environment 204. In these illustrative examples, virtual environment 204 may take various forms.

For example, virtual environment 204 may be at least one of a design environment, a maintenance environment, a manufacturing environment, and other suitable types of environments. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

When virtual environment 204 is a design environment, person 206 may interact with virtual environment 204 to design a product such as an aircraft, a ship, a ground vehicle, a spacecraft, a satellite, an engine, an antenna, a composite part, a chair, and other suitable products. When virtual environment 204 takes the form of a maintenance environment, person 206 may practice performing maintenance on a platform such as an aircraft. Additionally, person 206 may use the maintenance environment to identify maintenance procedures for the aircraft for use in physical environment 202.

When virtual environment 204 is a manufacturing environment, person 206 may interact with the manufacturing environment to obtain information about manufacturing processes. For example, person 206 may change components in the manufacturing environment to see how the changes affect the manufacturing of a product. In this manner, person 206 may identify changes to components or procedures used to manufacture a product in physical environment 202.

Image processor 216 is configured to generate images 218 that are displayed to person 206 through interface system 210. Images 218 are images of virtual environment 204 as seen by person 206 through the interaction of person 206 with virtual environment 204. In these illustrative examples, images 218 are two-dimensional images. Images 218 may be viewed by person 206 to reconstruct a three-dimensional view of virtual environment 204.

As depicted, interface system 210 is hardware and may include software. In these illustrative examples, interface system 210 is configured to provide person 206 an ability to interact with virtual environment 204. This interaction may include input into virtual environment 204 as well as receiving output from virtual environment 204.

As depicted, interface system 210 is comprised of a number of different components. In this illustrative example, interface system 210 includes display device 220 and sensor system 222.

Display device 220 is configured to display images 218 generated by image processor 216 in virtual environment generator 208. In this manner, person 206 may see virtual environment 204.

In these illustrative examples, sensor system 222 is configured to generate information 224 about person 206. In particular, sensor system 222 may generate first eye position information 226, second eye position information 228, and head position information 230. Additionally, sensor system 222 may also generate information about the position and movement of other parts of person 206. These other parts may include, for example, hands, fingers, arms, feet, and other suitable parts.

First eye position information 226 is for first position 232 of first eye 234 in head 236 of person 206. Second eye position information 228 is for second position 238 of second eye 240 in head 236 of person 206. Head position information 230 is for head position 242 of head 236 of person 206 in these illustrative examples.

As depicted, first eye position information 226, second eye position information 228, and head position information 230 may include a number of different types of information. First eye position information 226, second eye position information 228, and head position information 230 may include, for example, a location and an orientation of an object. The location may be described in three dimensions using a three-dimensional coordinate system. The orientation may be described in a number of different ways. For example, the orientation may be described using a system such as relative space using Euler angles, a directional vector, a matrix, a quaternion, a combination of yaw, pitch and roll or another frame of reference.

First eye position information 226, second eye position information 228, and head position information 230 may be sent as part of information 224 from sensor system 222 to virtual environment generator 208. Controller 214 may use information 224 to make changes to virtual environment 204 based on input generated by person 206 or based on other events that may be generated by controller 214 or from other sources.

Image processor 216 is configured to use first eye position information 226 and second eye position information 228 to generate images 218. In these illustrative examples, head position information 230 may be optional in generating images 218. As depicted, image processor 216 generates first virtual camera 244 and second virtual camera 246 in virtual environment 204. In this illustrative example, first virtual camera 244 and second virtual camera 246 are located in avatar 248. Avatar 248 is a virtual representation of person 206 in virtual environment 204. In particular, first virtual camera 244 and second virtual camera 246 may be located in head 250 of avatar 248 in these illustrative examples.

In one example, image processor 216 is configured to generate first image 252 in images 218 of virtual environment 204 for first eye 234 based on first eye position information 226. Additionally, image processor 216 is also configured to generate second image 254 in images 218 of virtual environment 204 for second eye 240 based on second eye position information 228. Image processor 216 is configured to send first image 252 and second image 254 for display to person 206. In these illustrative examples, first image 252 and second image 254 are sent to display device 220.

In these illustrative examples, image processor 216 is configured to identify first position 256 for first virtual camera 244 in virtual environment 204 representing first viewpoint 258 of first eye 234 in virtual environment 204. Additionally, image processor 216 is configured to identify second position 260 of second virtual camera 246 in virtual environment 204 representing second viewpoint 262 of second eye 240 in virtual environment 204.

In these illustrative examples, first image 252 is an image of virtual environment 204 as seen by first virtual camera 244. Second image 254 is an image of virtual environment 204 as seen by second virtual camera 246.

When first image 252 and second image 254 are sent to display device 220, display device 220 displays first image 252 to first eye 234 of person 206. Display device 220 displays second image 254 to second eye 240 of person 206 in these illustrative examples. First image 252 and second image 254 are two-dimensional images and are processed by person 206 to reconstruct a three-dimensional image of virtual environment 204.

With the generation of first image 252 and second image 254 from first viewpoint 258 and second viewpoint 262, respectively, the experience of person 206 interacting with virtual environment 204 may occur with a reduction in undesired effects from viewing images 218 of virtual environment 204. In these illustrative examples, first virtual camera 244 and second virtual camera 246 may be positioned in a manner that correlates to first position 232 of first eye 234 and second position 238 of second eye 240.

In these illustrative examples, first virtual camera 244 and second virtual camera 246 may be vertically positioned based on head position information 230. In particular, the height of head 236 may be used to position first virtual camera 244 and second virtual camera 246.

Head position information 230 may be used to position head 250 of avatar 248 with head position 264 within virtual environment 204. Head position 264 of head 250 for avatar 248 in virtual environment 204 corresponds to head position 242 of head 236 of person 206 in physical environment 202. In other words, the orientation of head 250 for avatar 248 corresponds to the orientation of head 236 of person 206.

In other words, the positioning of head 250 of avatar 248 with first virtual camera 244 and second virtual camera 246 may be with respect to the distance that head 236 of person 206 is from the ground. This distance may vary depending on whether person 206 is standing, sitting, standing on the ground, standing on an object, or in some other suitable position.

Additionally, first virtual camera 244 and second virtual camera 246 may be positioned relative to each other based on a pupillary distance of first eye 234 to second eye 240. The pupillary distance may be a distance between the pupils in first eye 234 and second eye 240. Pupillary distance may also be referred to as an interpupillary distance. In particular, the pupillary distance is the distance between the centers of pupils in the eyes of person 206. This pupillary distance may be used by image processor 216 to generate positions of first virtual camera 244 and second virtual camera 246 in head 250 of avatar 248.

In these illustrative examples, as first eye 234 and second eye 240 move to different positions, first virtual camera 244 and second virtual camera 246 are also moved to corresponding different positions. In a similar fashion, when head 236 of person 206 moves, head 250 of avatar 248 in virtual environment 204 also may move. Of course, head position information 230 may be optional. For example, when first eye position information 226 and second eye position information 228 include coordinates of first eye 234 and second eye 240 in three dimensions, the location of head 236 in three dimensions is not needed.

Further, the orientation of first eye 234 and second eye 240 may be relative to a plane or other reference point other than head 236 of person 206. In this type of implementation, head position information 230 of head 236 may not be needed.

In other illustrative examples, head position information 230 may include a location of head 236 in three dimensions as well as orientation of head 236. First eye position information 226 and second eye position information 228 may include an orientation of first eye 234 and second eye 240 in head 236. In other words, first eye position information 226 and second eye position information 228 may be relative to head 236 rather than some other reference object.

In this type of implementation, head position information 230 is used in conjunction with first eye position information 226 and second eye position information 228 to generate a position for head 250 along with first virtual camera 244 and second virtual camera 246. In this instance, image processor 216 generates first image 252 based on first eye position information 226 and head position information 230. In a similar fashion, image processor 216 generates second image 254 based on second eye position information 228 and head position information 230.

Figure 3:
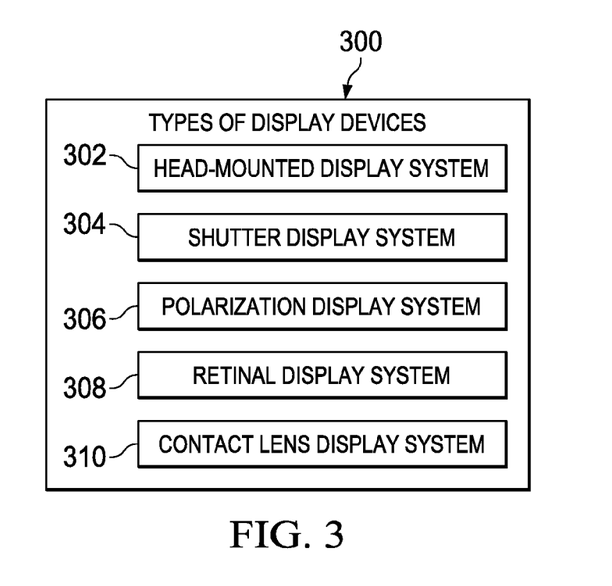
FIG. 3 is an illustration of a block diagram of implementations for a display device in accordance with an illustrative embodiment.

With reference now to FIG. 3, an illustration of a block diagram of implementations for a display device is depicted in accordance with an illustrative embodiment. In this depicted example, types of display devices 300 are examples of different types of display devices that may be used to implement display device 220 in FIG. 2.

In these illustrative examples, types of display devices 300 include a number of different types of devices. In this example, types of display devices 300 include head-mounted display system 302, shutter display system 304, polarization display system 306, retinal display system 308, and contact lens display system 310.

Head-mounted display system 302 may be a display device worn on head 236 of person 206 in FIG. 2. Head-mounted display system 302 also may include sensors from sensor system 222 to generate information about first eye 234, second eye 240, and head 236 of person 206. The display in head-mounted display system 302 may be, for example, without limitation, a liquid crystal display, a light-emitting diode display, a plasma display, or some other suitable type of display. The display in head-mounted display system 302 may be constructed of one or more independent display systems.

Shutter display system 304 may be a display viewed by person 206 using active shutter glasses that have a shutter system that only allows one of first eye 234 and second eye 240 to view the display at any one point in time. With this type of display system, the display of first image 252 and second image 254 on the display is alternated to correspond to when first eye 234 and second eye 240 are able to see the display.

Polarization display system 306 involves displaying both first image 252 and second image 254 on the display at the same time such that first image 252 and second image 254 are displayed with different polarizations. Polarizing glasses in polarization display system 306 may be worn by person 206 to allow each eye to view the correct image.

Retinal display system 308 is configured to project a raster display onto the retina of the eye. Retinal display system 308 may include a projector that generates a beam that scans the retina of the eye.

Contact lens display system 310 takes the form of a contact lens that is placed on first eye 234 and second eye 240. These contact lenses include electronic circuits and light-emitting diodes. The light-emitting diodes in the circuits are configured to generate an image that is viewed by first eye 234 and second eye 240.

Figure 4:
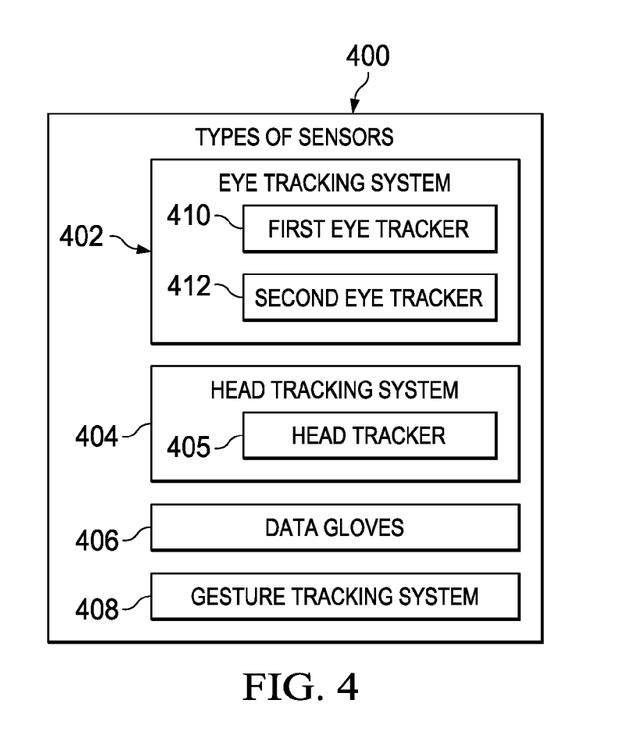
FIG. 4 is an illustration of a block diagram of types of sensors that may be used in a sensor system in a virtual environment system in accordance with an illustrative embodiment.

Turning now to FIG. 4, an illustration of a block diagram of types of sensors that may be used in a sensor system in a virtual environment system is depicted in accordance with an illustrative embodiment. In this illustrative example, types of sensors 400 include different types of sensors that may be used in sensor system 222 in FIG. 2.

In this illustrative example, types of sensors 400 may include a number of different types of sensors. For example, types of sensors 400 may include eye tracking system 402, head tracking system 404, data gloves 406, and gesture tracking system 408.

Eye tracking system 402 may include first eye tracker 410 and second eye tracker 412. First eye tracker 410 is configured to track first position 232 of first eye 234 and generate first eye position information 226 in FIG. 2. Second eye tracker 412 is configured to track second position 238 of second eye 240 and generate second eye position information 228.

In these illustrative examples, eye tracking system 402 may be associated with head-mounted display system 302 or may be a separate device. In these illustrative examples, eye tracking system 402 tracks first position 232 of first eye 234 and second position 238 of second eye 240 as opposed to the gaze of first eye 234 and second eye 240.

Gaze tracking involves identifying a region in an image viewed by first eye 234 and second eye 240 as opposed to first position 232 of first eye 234 and second position 238 of second eye 240. In some illustrative examples, first eye position information 226 and second eye position information 228 for first position 232 of first eye 234 and second position 238 of second eye 240 may be used to identify a gaze for person 206.

Further, eye tracking system 402 may use various techniques such as corneal reflection to generate information about the orientation of first eye 234 and second eye 240. These techniques are based on the location of an illumination source with respect to optics. Eye tracking system 402 may be implemented using cameras with hardware devices as well as other suitable devices.

As a result, first eye tracker 410 and second eye tracker 412 may be separate cameras or may be implemented in a single camera with first eye tracker 410 and second eye tracker 412 being implemented using software processes.

Further, in some illustrative examples, eye tracking system 402 may be implemented using contact lenses containing an imprinted pattern which is tracked by a camera or other suitable device. Eye tracking system 402 may be implemented using a search coil implanted in contact lenses or directly implanted in the first eye 234 and second eye 240. Eye tracking system 402 may be implemented using muscle activity sensors placed around the first eye 234 and second eye 240.

In these illustrative examples, head tracking system 404 is a hardware device configured to identify head position 242 of head 236 of person 206 and generate head position information 230. Head tracking system 404 may include head tracker 405. Head tracker 405 may include tracking sensors that detect a change in angle and orientation of head 236. These sensors may be, for example, accelerometers or other suitable types of sensors. In other illustrative examples, head tracker 405 may be implemented using a camera system and markers on head 236 of person 206 or on head-mounted display system 302. Further, in some illustrative examples, head tracking system 404 may be implemented as part of head-mounted display system 302.

Data gloves 406 are hardware devices worn by person 206. These devices may identify the position of the hands of person 206 as well as various gestures generated by the hands of person 206.

As depicted, gesture tracking system 408 is configured to identify the movements and gestures of the hands of person 206. Gesture tracking system 408 may include cameras, motion detectors, and other devices that generate information used to identify gestures and positions of the hands of person 206.

The illustration of virtual environment system 200 and the components in virtual environment system 200 in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more persons in addition to person 206 may interact with virtual environment 204. These additional persons may use interface system 210. In another illustrative example, display device 220 and sensor system 222 may be implemented as a single component. As another illustrative example, other types of sensors may be used in addition to or in place of the ones listed in types of sensor 400 in FIG. 4. For example, a joystick, a tracking wand, a gun peripheral, a mouse, and other suitable devices may be used.

As another illustrative example, display device 220 is configured to provide a view of physical environment 202 around person 206 in addition to first image 252 and second image 254 in images 218 for virtual environment 204. In other words, the display of first image 252 and second image 254 may be used to provide an augmented reality display to person 206. This augmented reality display combines a view of physical environment 202 with a view of virtual environment 204. For example, person 206 may view an aircraft in physical environment 202. Virtual environment 204 may recreate the aircraft and provide views of the interior of the aircraft. These views of the interior of the aircraft may be used to generate first image 252 and second image 254 that are displayed on display device 220 in a manner that overlays the physical view of the aircraft in physical environment 202.

In this manner, virtual environment system 200 may be used to generate views for a purely virtual environment for various operations such as design, maintenance, training, and other suitable operations. Further, virtual environment system 200 may be included as part of an augmented reality generation system that generates virtual environment 204 in a manner that may be overlaid with physical environment 202 to provide person 206 with additional information about physical environment 202.

Figure 5:
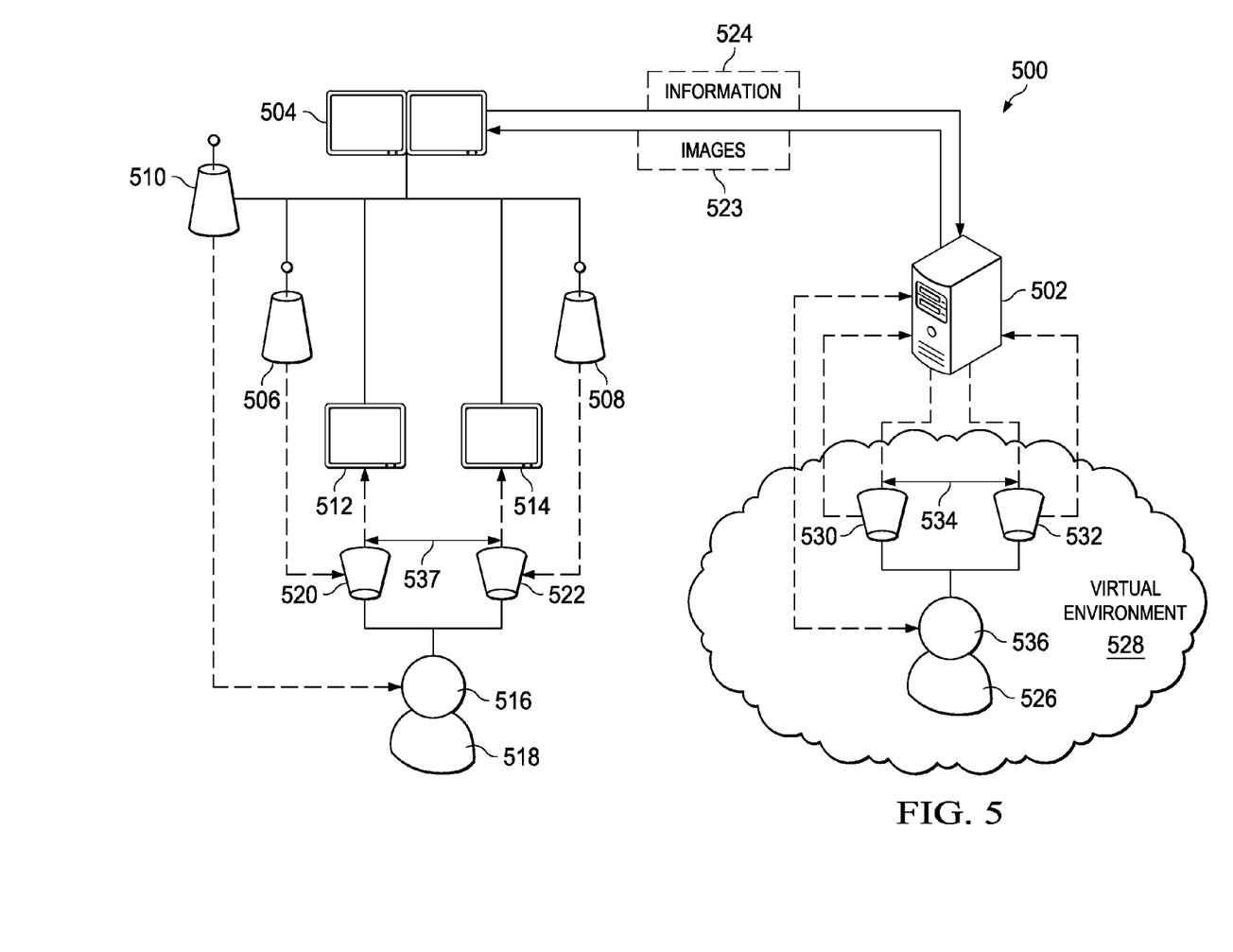
FIG. 5 is an illustration of diagram of a virtual environment system in accordance with an illustrative embodiment.

With reference now to FIG. 5, an illustration of a diagram of a virtual environment system is depicted in accordance with an illustrative embodiment. In this depicted example, virtual environment system 500 is an example of one implementation for virtual environment system 200 shown in block form in FIG. 2.

In this illustrative example, virtual environment system 500 includes virtual environment generator 502 and head-mounted display device 504.

In this illustrative example, head-mounted display device 504 includes first eye tracker 506, second eye tracker 508, head tracker 510, first display 512, and second display 514. Head-mounted display device 504 is configured to be worn on head 516 of person 518.

In these illustrative examples, first eye tracker 506 is configured to track the position of first eye 520 in head 516 of person 518. Second eye tracker 508 is configured to track the position of second eye 522 in head 516 of person 518. In particular, first eye tracker 506 and second eye tracker 508 may track the orientation of first eye 520 and second eye 522, respectively.

First display 512 is configured to display images to first eye 520 while second display 514 is configured to display images to second eye 522. In particular, first display 512 and second display 514 display images 523 that are received from virtual environment generator 502.

In this illustrative example, first display 512 and second display 514 are isolated from each other such that first eye 520 cannot see second display 514 and second eye 522 cannot see first display 512. As depicted, first display 512 and second display 514 may be implemented using various types of displays. For example, a liquid crystal display, a light-emitting diode display, a plasma display, or some other suitable type of display may be used for first display 512, second display 514, or both first display 512 and second display 514.

Head tracker 510 is configured to track the position of head 516 of person 518 in these illustrative examples. In these illustrative examples, head-mounted display device 504 sends information 524 to virtual environment generator 502. As depicted, information 524 is tracking information about first eye 520 and second eye 522. Additionally, information 524 also may include head position information generated by head tracker 510.

Virtual environment generator 502 receives information 524. In this illustrative example, virtual environment generator 502 may be implemented using a computer. Virtual environment generator 502 is configured to create and operate virtual environment 528.

Virtual environment generator 502 may communicate with head-mounted display device 504 using a communications link. This communications link may be, for example, without limitation, a wired communications link, an optical communications link, a wireless communications link, or some combination thereof.

Information 524 received from head-mounted display device 504 is used by virtual environment generator 502 to generate avatar 526 and position avatar 526 in virtual environment 528. Avatar 526 is a representation of person 518 in virtual environment 528.

In these illustrative examples, information 524 is also used to identify a position for first virtual camera 530 and second virtual camera 532 in avatar 526. In particular, first virtual camera 530 and second virtual camera 532 may be located on head 536 of avatar 526 in these illustrative examples.

First virtual camera 530 and second virtual camera 532 represent first eye 520 and second eye 522, respectively. In other words, a one-to-one correlation is present between the virtual cameras and the eyes. In these illustrative examples, first virtual camera 530 and second virtual camera 532 have distance 534 that corresponds to pupillary distance 537 between first eye 520 and second eye 522.

In these illustrative examples, as first eye 520 and second eye 522 move in head 516, first virtual camera 530 and second virtual camera 532 are repositioned to have a corresponding movement using information 524. Further, when head 516 of person 518 moves, head 536 of avatar 526 also moves.

First virtual camera 530 and second virtual camera 532 may be used by virtual environment generator 502 to generate images based on the views that can be seen of virtual environment 528 by first virtual camera 530 and second virtual camera 532. Information 524 may update the position of first virtual camera 530 and second virtual camera 532 in these illustrative examples.

The illustration of virtual environment system 500 as an implementation of virtual environment system 200 shown in block form in FIG. 2 is not meant to imply limitations to the manner in which different virtual environment systems can be implemented. For example, in some illustrative embodiments, a contact lens display system may be used in place of head-mounted display device 504. In still other illustrative examples, virtual cameras may be used without avatar 526.

The different components shown in FIGS. 2-4 may be combined with components in FIG. 1 and FIG. 5, used with components in FIG. 1 and FIG. 5, or a combination of the two. Additionally, some of the components in FIG. 1 may be illustrative examples of how components shown in block form in FIGS. 2-4 and diagrammatically in FIG. 5 can be implemented as physical structures.

Figure 6:
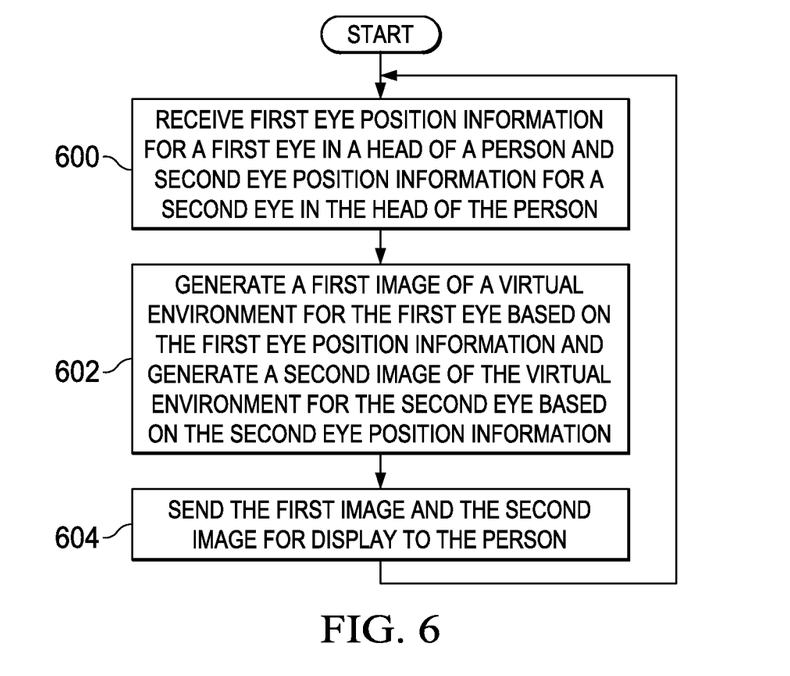
FIG. 6 is an illustration of a flowchart of a process for displaying a virtual environment in accordance with an illustrative embodiment.

With reference now to FIG. 6, an illustration of a flowchart of a process for displaying a virtual environment is depicted in accordance with an illustrative embodiment. The process illustrated in FIG. 6 may be implemented using virtual environment system 200 in FIG. 2.

The process begins by receiving first eye position information for a first eye in a head of a person and second eye position information for a second eye in the head of the person (operation 600). The process then generates a first image of a virtual environment for the first eye based on the first eye position information and generates a second image of the virtual environment for the second eye based on the second eye position information (operation 602). In operation 602, the images are generated such that the viewpoints for generating the images in the virtual environment correspond to the viewpoints of the eyes of the person in the physical environment. The process then sends the first image and the second image for display to the person (operation 604) with the process then returning to operation 600.

These different operations may repeat as long as the person is interacting with the virtual environment. Using the different operations in the flowchart of FIG. 6 provides a person viewing a virtual environment a more natural experience. In particular, the images are generated from viewpoints of the eyes of the person using the same viewpoints in the virtual environment.

Figure 7A:
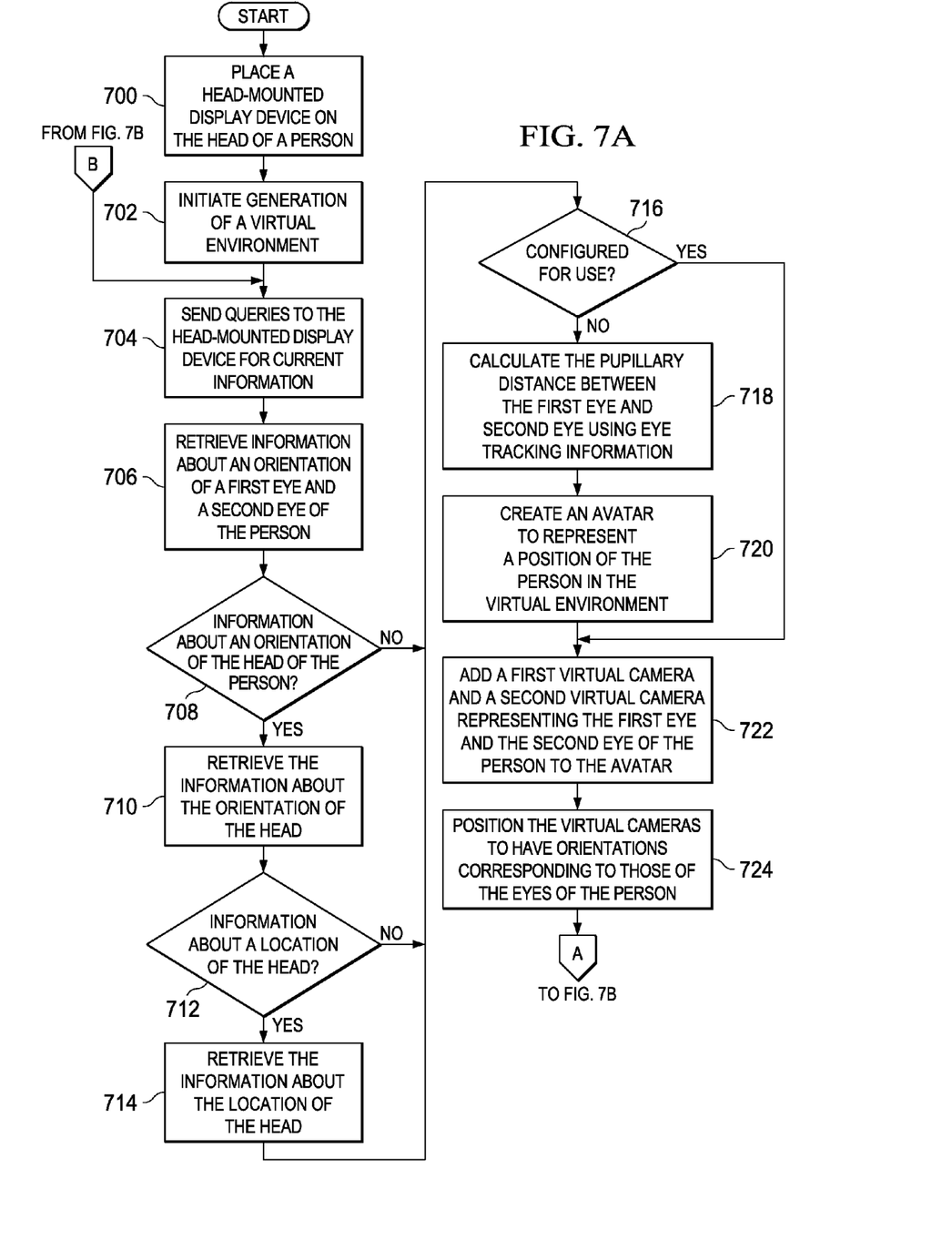
FIGS. 7A and 7B are an illustration of a flowchart of a process for viewing a virtual environment in accordance with an illustrative embodiment.
Figure 7B:
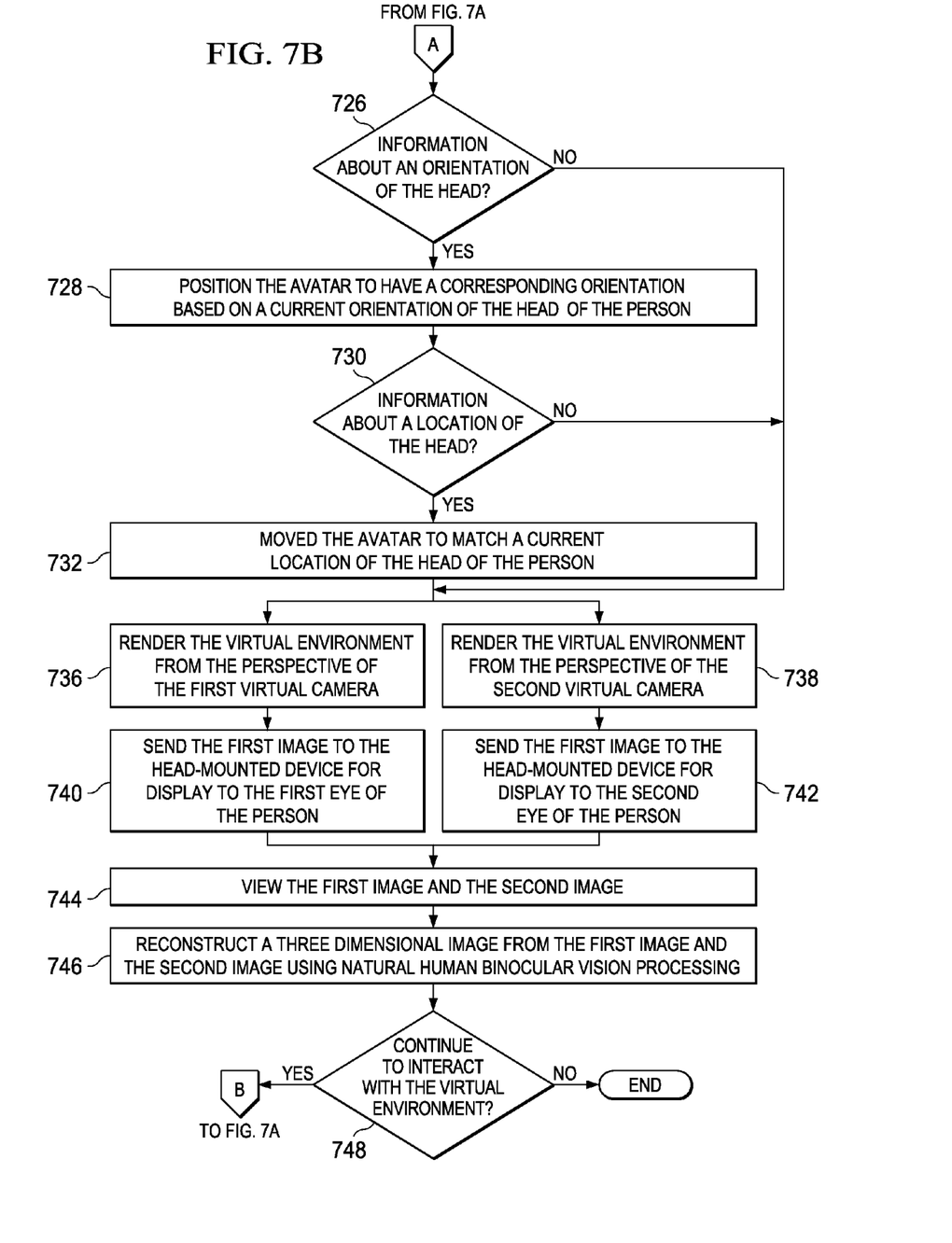

Turning now to FIGS. 7A and 7B, an illustration of a flowchart of a process for viewing a virtual environment is depicted in accordance with an illustrative embodiment. The process illustrated in FIGS. 7A and 7B may be implemented using virtual environment system 200 in FIG. 2 to generate images 218 for viewing by person 206 using display device 220. The different operations illustrated in FIGS. 7A and 7B describe operations performed both by virtual environment system 200 and person 206 in FIG. 2 during the interaction of person 206 with virtual environment 204.

The process begins by placing a head-mounted display device on a head of the person (operation 700). The head-mounted display device is an implementation for display device 220 and also may include at least a portion of sensor system 222. The head-mounted display device may track eye movement and optionally head movement.

The person then initiates generation of a virtual environment (operation 702). In this operation, the person may turn on the virtual environment system to start the generation of the virtual environment. In these illustrative examples, a virtual environment generator, such as virtual environment generator 208 in FIG. 2 may begin generation of the virtual environment.

The virtual environment generator sends queries to the head-mounted display device for current information (operation 704). The query causes the head-mounted display device to generate the information in the query. This current information includes information about the position of the eyes of the person. The current information may also include the head position and other suitable information. The query in operation 704 may be made on a periodic basis in these illustrative examples. Further, the position of the eyes may be a location of the eyes in three dimensions, an orientation, or both.

The virtual environment generator retrieves information about an orientation of a first eye and a second eye of the person (operation 706). In these illustrative examples, the first eye may correspond to the left eye and the second eye may correspond to the right eye of the person.

A determination is then made as to whether the head-mounted display device includes information about an orientation of the head of the person (operation 708). If the head-mounted display device includes information about the orientation of the head, the virtual environment generator retrieves the information about the orientation of the head (operation 710).

Next, a determination is made as to whether the head-mounted display device includes information about a location of the head (operation 712). In operation 712, the location may be described using a three-dimensional coordinate system. If the head-mounted display device includes this information, the head-mounted display device retrieves the information about the location of the head (operation 714). In these illustrative examples, the information about the orientation and the location of the head forms head position information.

Next, a determination is made as to whether the virtual environment generator has been configured for use by the person (operation 716). If the virtual environment generator has not been configured for use by the person, the pupillary distance between the first eye and second eye are calculated using eye tracking information (operation 718). In these illustrative examples, the eye tracking information may include orientation of the first eye and the second eye, characteristics of the head-mounted display device, the distance between eye trackers, sensor viewing angles, and other suitable information that may be used to calculate the distance between the pupils of the person.

In these illustrative examples, the pupillary distance may be identified using a number of different techniques. One technique for identifying the pupillary distance includes taking multiple samples from each eye when focused on a control point. This control point may be, for example, a crosshair in the center, extremes of the display device, or some combination thereof. Next, the viewing direction for each control point for each eye is calculated. The position of the eye relative to the eye tracking sensor or eye tracking sensors is calculated using multiple viewing directions. Next, the distance between eye tracking sensors is calculated. Finally, the distance between each eye based on the eye-sensor offsets and sensor-sensor offsets is calculated.

This and other information about the person may be stored in a number of different locations. For example, information may be stored in at least one of the head-mounted display device, a virtual environment generator, a remote database, or some other suitable location. In still other illustrative examples, the person may enter at least some of the information.

The virtual environment generator then creates an avatar to represent a position of the person in the virtual environment (operation 720). A first virtual camera and a second virtual camera representing the first eye and the second eye of the person are added to the avatar (operation 722). The placement of the virtual cameras is performed using information about the eyes retrieved from the head-mounted display device. The placement also may be based on information about the head of the person if that information is available.

The virtual cameras may be added based on the calculated pupillary distance between the eyes of the person and current information about the eyes of the person. Information about the head of the person may also be used if available. The horizontal spacing of the virtual cameras may be based on the pupillary distance. The vertical distance of the cameras from the floor of the virtual environment may be based on information about the head of the person. Additionally, the positioning of the virtual cameras also may take into account that one eye of the person may be vertically higher than the other eye of the person. The positioning of the virtual cameras also may take into account that the eyes of a person may not be symmetrically aligned.

The virtual environment generator positions the virtual cameras to have orientations corresponding to those of the eyes of the person (operation 724). This positioning is performed based on current information retrieved from the head-mounted display device. In this manner, the virtual cameras may have viewpoints that correspond to those of the eyes of the person based on the location of the eyes and the orientation of the eyes identified from the information retrieved from the head-mounted display device.

Next, a determination is made as to whether the information retrieved from the head-mounted display device includes information about the orientation of the head (operation 726). If the information retrieved includes information about an orientation of the head, the avatar is positioned to have a corresponding orientation based on a current orientation of the head of the person (operation 728).

This change in the orientation of the avatar also changes the orientation of the virtual cameras which, in turn, changes the viewpoints of the virtual cameras. In this manner, changes in the head of the person and the eyes of the person may be reflected by the avatar and the virtual cameras in the avatar.

A determination is made as to whether the information retrieved from the head-mounted display device includes information about a location of the head (operation 730). If the information retrieved includes information about the location of the head, the avatar is moved to match a current location of the head of the person (operation 732).

The virtual environment generator then renders the virtual environment from the perspective of the first virtual camera (operation 736). In other words, the virtual environment generator generates graphical information from a particular perspective. This rendering results in a first image of the virtual environment being generated from the viewpoint of the first virtual camera. In other words, the virtual environment generator generates the first image of the virtual environment that is seen by the first virtual camera. In a similar fashion, the virtual environment generator renders the virtual environment from the perspective of the second virtual camera (operation 738). This rendering results in a second image being generated of the virtual environment from the viewpoint of the second virtual camera. As with the first virtual camera, the virtual environment generator generates the second image of the virtual environment that is seen by the second virtual camera.

The resulting first image and second image generated in operation 736 and operation 738 provide two views of the virtual environment from slightly different viewpoints. In other words, these images provide views from slightly different perspectives that correspond to the perspective of the eyes of the person.

With the virtual cameras being positioned to have orientations that correspond to the eyes of the person, the images are tailored for a first person. When a head-mounted display device is used by a second person, the positioning of the virtual cameras are different to take into account differences in the positioning of the eyes of the second person as compared to the eyes of the first person.

The first image is sent to the head-mounted display device for display to the first eye of the person (operation 740). The second image is sent to the head-mounted display device for display to the second eye of the person (operation 742). In these illustrative examples, operation 736 and operation 738 are performed at substantially the same time. Operation 740 and operation 742 are also performed at substantially the same time.

The person views the first image and the second image (operation 744). The person then reconstructs a three-dimensional image from the first image and the second image using natural human binocular vision processing (operation 746). A determination is made as to whether to continue to interact with the virtual environment (operation 748). If the person chooses not to continue to interact with the virtual environment, the process terminates. Otherwise, the process returns to operation 704.

With reference again to operation 730, if the information retrieved does not include the location of the head, the process proceeds to operation 736 and operation 738. Turning back to operation 726, if the information retrieved does not include an orientation of the head, the process also proceeds to operation 736 and operation 738

Turning back to operation 716, if the virtual environment generator has been configured for use by the person, the process proceeds to operation 736 and operation 738 and does not perform operations to configure or calibrate the virtual environment generator to the head-mounted display device. With reference again to operation 712, if the information retrieved does not include the location of the head, the process proceeds to operation 716. The process also proceeds to operation 716 from operation 708 if the information retrieved does not include the orientation of the head.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the different operations describe retrieving information from the head-mounted display device. In some illustrative examples, the head-mounted display device may automatically send the information without queries or the virtual environment generator retrieving the information. Further in some illustrative examples, operation 736 and operation 738 may be performed sequentially instead of at substantially the same time. In yet other illustrative examples, operation 730 and operation 732 may be omitted. The information about the position of the eyes may include both a location in three dimensional space and an orientation.

Figure 8:
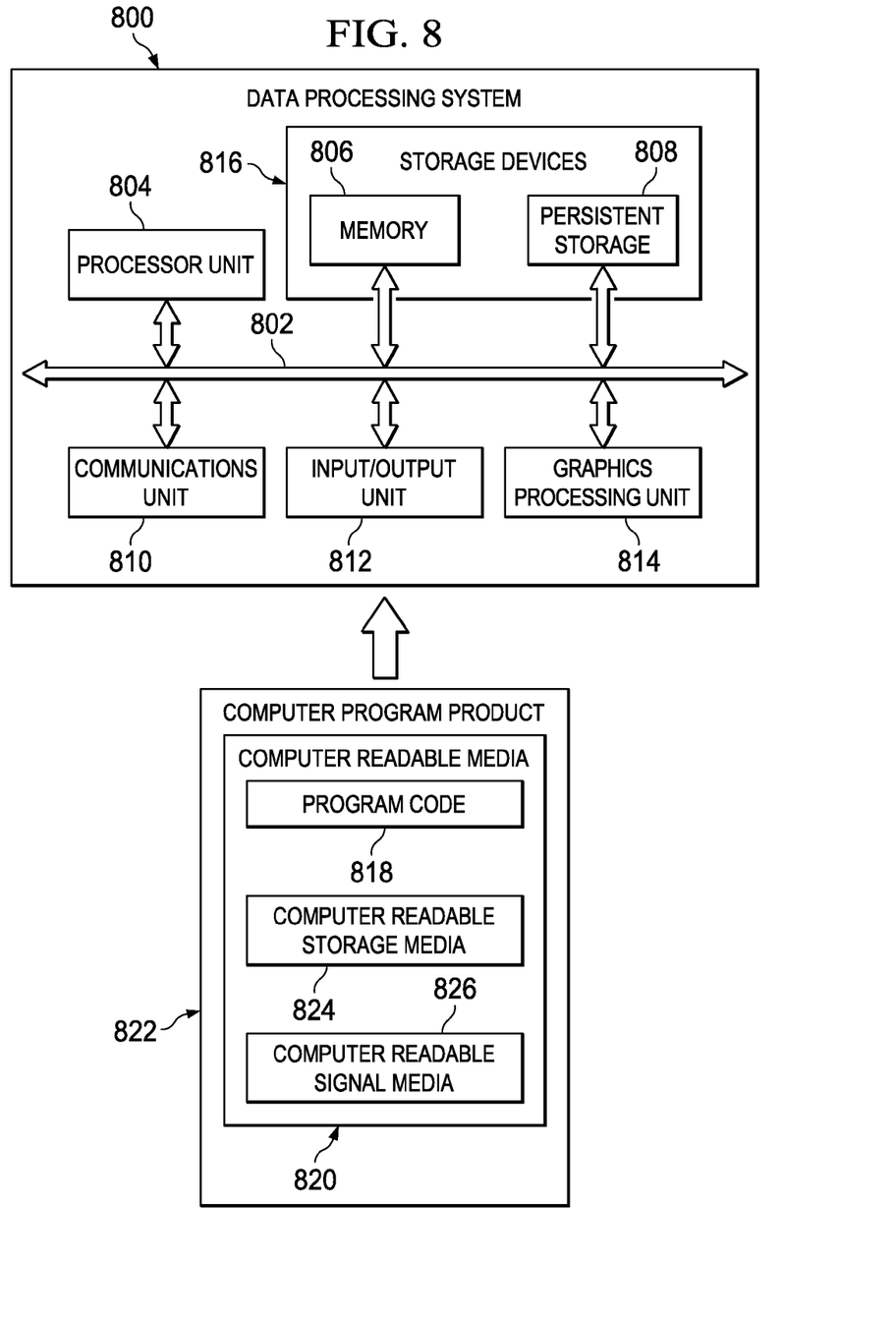
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 may be used to implement computer 102 in FIG. 1, computer system 212 in FIG. 2, and virtual environment generator 502 in FIG. 5. In this illustrative example, data processing system 800 includes communications framework 802, which provides communications between processor unit 804, memory 806, persistent storage 808, communications unit 810, input/output (I/O) unit 812, and graphics processing unit 814. In this example, communication framework may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Graphics processing unit 814 provides a mechanism to generate graphics information for display to a user.

Instructions for the operating system, applications, and/or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code 818.

Thus, the illustrative embodiments provide a more natural viewing experience for a person interacting with a virtual environment. In one illustrative example, additional parameters in addition to tracking the head of the person is performed. The virtual environment generator takes into account information about the eyes of the person.

For example, the pupillary distance and the orientation of the eyes are taken into account in addition to the location and orientation of the head of the person. As a result, individual distances between persons that may be caused by different pupillary distances or sight line distances from height differences of the persons may be taken into account when generating images for the persons. As a result, a customized representation of the virtual environment is generated for each person.

In one or more illustrative examples, the position of the eyes is tracked to identify a viewing location and direction in the virtual environment. In other words, a viewpoint is generated for each of the eyes of the person. These viewpoints are used to generate images in the virtual environment for the person. Virtual cameras are used in the illustrative examples to recreate the corresponding viewpoint of the person in the virtual environment.

As a result, two-dimensional images may be viewed by the person with the person reconstructing the three-dimensional image. This reconstruction may be performed using natural binocular vision processing in which the person reconstructs a three-dimensional image from two two-dimensional images in which each two-dimensional image is generated specifically for the particular eye of the person.

Thus, with one or more illustrative embodiments, a person may have a more realistic view of a virtual environment. Further, undesired effects from interacting with a virtual environment also may be reduced.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a head tracker configured to track a head position of a head of a person and generate head position information for the head position;
   a display device, wherein the display device is selected from one of a head-mounted display system, a shutter display system, a polarization display system, a retinal display system, and a contact lens display system;
   an image processor configured to:
      receive first eye position information for a first eye in the head of the person and second eye position information for a second eye in the head of the person;
      generate a first image of a virtual environment for the first eye based on the first eye position information for the first eye;
      generate a second image of the virtual environment for the second eye based on the second eye position information for the second eye;
      send the first image and the second image to a display device for display to the person;
      identify a first position of a first virtual camera in the virtual environment representing a first viewpoint of the first eye in the virtual environment and a second position of a second virtual camera in the virtual environment representing a second viewpoint of the second eye in the virtual environment;
      generate the first image of the virtual environment seen by the first virtual camera; and
      generate the second image of the virtual environment seen by the second virtual camera; and
   an avatar in the virtual environment, wherein the avatar represents the person in the virtual environment, and wherein the avatar is moved within the virtual environment to match a position of the head using the head position information for the position of the head.

2. The apparatus of claim 1, wherein the display device is configured to receive the first image and the second image, display the first image to the first eye, and display the second image to the second eye.

3. The apparatus of claim 2, wherein the display device is selected from one of a head-mounted display system, a shutter display system, a polarization display system, a retinal display system, and a contact lens display system.

4. The apparatus of claim 2, wherein the display device includes:
   a first display configured to display the first image to the first eye; and
   a second display configured to display the second image to the second eye.

5. An apparatus comprising:
   a head tracker configured to track a head position of a head of a person and generate head position information for the head position;
   a display device, wherein the display device is selected from one of a head-mounted display system, a shutter display system, a polarization display system, a retinal display system, and a contact lens display system; and
   an image processor configured to:
      receive first eye position information for a first eye in the head of the person and second eye position information for a second eye in the head of the person;
      identify a first virtual camera associated with a head of the avatar in the virtual environment, wherein the first virtual camera is positioned using the first eye position information, and a second virtual camera associated with the head of the avatar in the virtual environment, wherein the second virtual camera is positioned using the second eye position information;
      generate a first image of a virtual environment for the first eye based on the first eye position information for the first eye;
      generate a second image of the virtual environment for the second eye based on the second eye position information for the second eye;
      send the first image and the second image to a display device for display to the person; and
      generate an avatar in the virtual environment, wherein the avatar represents the person in the virtual environment, and wherein the avatar is moved within the virtual environment to match a position of the head using the head position information for the position of the head.

6. The apparatus of claim 5, wherein the first virtual camera and the second virtual camera are vertically positioned using the head position information.

7. The apparatus of claim 2, wherein the display device is configured to provide a view of a physical environment around the person in addition to the first image and the second image.

8. A method for displaying a virtual environment, the method comprising:
   tracking, via a head tracker, a head position of a head of a person;
   generating head position information for the head position;
   receiving, via an image processor, first eye position information for a first eye in the head of the person and second eye position information for a second eye in the head of the person;
   generating, via an image processor, a first image of the virtual environment for the first eye based on the first eye position information;
   generating, via an image processor, a second image of the virtual environment for the second eye based on the second eye position information for the second eye;
   generating, via an image processor, an avatar in the virtual environment, wherein the avatar represents the person in the virtual environment;
   moving the avatar within the virtual environment to match a position of the head using the head position information for the position of the head;
   sending the first image and the second image to a display device for display to the person; and
   identifying a first position of a first virtual camera in the virtual environment representing a first viewpoint of the first eye in the virtual environment, the first position of the first virtual camera based on the first eye position information, and a second position of a second virtual camera in the virtual environment representing a second viewpoint of the second eye in the virtual environment, the second position of the second virtual camera based on the second eye position information,
   wherein generating the first image comprises:
      generating the first image of the virtual environment seen by the first virtual camera, and wherein generating the second image comprises:
    generating the second image of the virtual environment seen by the second virtual camera.

9. The method of claim 8 further comprising:
receiving the head position information for the head position of the head of the person,
wherein generating the first image comprises:
    generating the first image of the virtual environment for the first eye based on the first eye position information for the first eye and the head position information,
wherein generating the second image comprises:
    generating the second image of the virtual environment for the second eye based on the second eye position information for the second eye and the head position information.

10. The method of claim 8 further comprising:
displaying the first image to the first eye using the display device; and
displaying the second image to the second eye using the display device.

11. The method of claim 8, wherein the display device is selected from one of a head-mounted display system, a shutter display system, a polarization display system, a retinal display system, and a contact lens display system.

12. The method of claim 8 further comprising:
tracking a first position of the first eye and a second position of the second eye using an eye tracking system; and
generating the first eye position information using the first position of the first eye and the second eye position information using the second position of the second eye.

13. The method of claim 10, wherein the display device is configured to provide a view of a physical environment around the person in addition to the first image and the second image.

14. An apparatus comprising:
a head tracker configured to track a head position of a head of a person and generate head position information for the head position;
an image processor configured to:
    receive first eye position information for a first eye in the head of the person and second eye position information for a second eye in the head of the person;
    generate a first image of a virtual environment for the first eye based on the first eye position information for the first eye;
    generate a second image of the virtual environment for the second eye based on the second eye position information for the second eye; and
    send the first image and the second image to a display device for display to the person;
an avatar in the virtual environment, wherein the avatar represents the person in the virtual environment, and wherein the avatar is moved within the virtual environment to match a position of the head using the head position information for the position of the head;
a first virtual camera associated with a head of the avatar in the virtual environment, wherein the first virtual camera is positioned using the first eye position information; and
a second virtual camera associated with the head of the avatar in the virtual environment, wherein the second virtual camera is positioned using the second eye position information.

* * * * *